April 11, 1950 L. C. ROBERTS 2,503,414

TELEGRAPH SWITCHING SYSTEM

Filed July 15, 1947 6 Sheets-Sheet 1

FIG. 1 WEST, FIG. 7

INVENTOR
L. C. ROBERTS
BY John E. Cassidy
ATTORNEY

April 11, 1950 L. C. ROBERTS 2,503,414

TELEGRAPH SWITCHING SYSTEM

Filed July 15, 1947 6 Sheets-Sheet 2

FIG. 2 WEST

INVENTOR
L.C. ROBERTS
BY John E. Cassidy
ATTORNEY

April 11, 1950 L. C. ROBERTS 2,503,414

TELEGRAPH SWITCHING SYSTEM

Filed July 15, 1947 6 Sheets-Sheet 3

FIG. 3 WEST

INVENTOR
L. C. ROBERTS
BY John E. Cassidy
ATTORNEY

INVENTOR
L. C. ROBERTS
BY John E. Cassidy
ATTORNEY

INVENTOR
L. C. ROBERTS
BY John E. Cassidy
ATTORNEY

April 11, 1950 L. C. ROBERTS 2,503,414
TELEGRAPH SWITCHING SYSTEM
Filed July 15, 1947 6 Sheets-Sheet 6
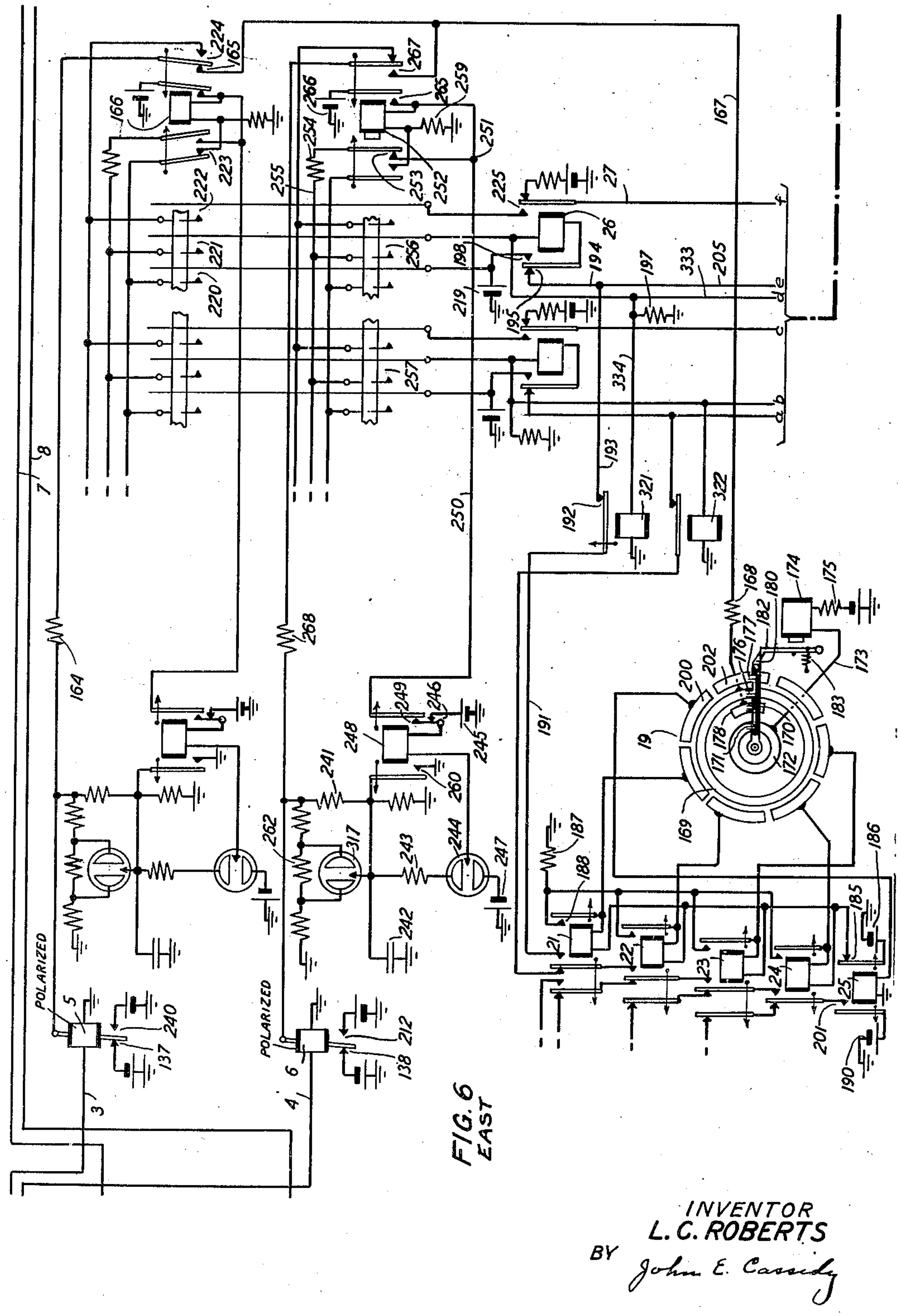
FIG. 6 EAST
INVENTOR
L. C. ROBERTS
BY John E. Cassidy
ATTORNEY Patented Apr. 11, 1950

2,503,414

UNITED STATES PATENT OFFICE 2,503,414

TELEGRAPH SWITCHING SYSTEM

Leland C. Roberts, West Orange, N. J., assignor to Bell Telephone Laboratories, Incorporated, New York, N. Y., a corporation of New York Application July 15, 1947, Serial No. 761,057

26 Claims. (Cl. 178—3)

This invention relates to telegraph switching systems and more particularly to an electromechanical telegraph switching system having improved selecting arrangements.

An object of the present invention is the improvement of telegraph switching systems.

A more particular object of the invention is the improvement in electromechanical switching systems.

A further object of the invention is the improvement of the selecting arrangements in an electromechanical switching system.

Reference is made to applicant's Reissue Patent 21,681, granted December 31, 1940. The present invention represents improvements over the arrangements disclosed in the foregoing patent. The above patent discloses an electromechanical telegraph switching system arranged for the interconnection of patrons in definite unchangeable pairs. That is to say, the system is arranged to interconnect a certain definite patron A in a first area to another certain definite patron A' in a distant second area. Either patron on originating a call will always be connected only to the other. Other pairs of patrons will be correspondingly served. The two areas will be interconnected by a certain number of telegraph channels, fewer channels than pairs of the patrons, depending upon the number of pairs and the traffic over the system. Sufficient channels are provided to care for the normal peak load traffic. This number will be less than if each patron were interconnected by an individual channel.

In the system disclosed in the above-identified patent as well as in the present system a channel interconnecting the two areas is preselected so that it will be available for the use of the next pair of patrons to be interconnected. Each patron in a particular area is identified by a particular calling code signal. When a patron in one area desires to be connected with his partner in the distant area he operates a break key. Thereupon, certain code transmitting apparatus is set into operation to transmit a train of code signals corresponding to the code combination of the distant patron over the preselected channel to the distant terminal station. In response to this, certain code receiving apparatus in the distant terminal effects the selection of the distant patron's telegraph loop circuit. Then the two partners are interconnected through the channel. When this operation has been completed a new channel is preselected by the transmitting equipment at the particular switching terminal of the breaking partner so that it is available for use by the next pair of partners requiring interconnection.

In the arrangement of the system described in the above-identified patent, in order to preselect a channel it was necessary to transmit a code identifying a channel which had been selected by the receiving equipment to which the called patron was connected, from the called patron's switching terminal back to the calling patron's terminal switching station. In response to the reception of this code the transmitting apparatus at the switching terminal of the breaking patron was connected to the channel identified by the code. This required the temporary use of a channel to effect selection in addition to the channel which was eventually preselected.

The present invention eliminates this difficulty by effecting a channel preselection directly at the station of the breaking patron by means of the transmitting selecting equipment alone, without the necessity of transmitting a code combination over a temporary channel defining a channel which has been selected at the receiving station.

Another improvement in the system of the present application is an arrangement for timing the duration of interconnections and in the event that there is no idle channel available when one is required, a busy channel which has been interconnected for longer than a fixed interval is pre-empted and made available for the interconnection of two patrons presently requiring a channel.

A further feature of the invention, therefore, is an arrangement in a preselecting telegraph channel system whereunder when all channels are busy a particular channel which has been interconnected for longer than a prescribed interval is pre-empted for use.

The present system is arranged so that a patron is automatically disconnected from a channel immediately upon the lapse of a short measured interval after communication between patrons ceases.

A feature of the invention therefore is an automatic disconnect arrangement which disconnects patrons and frees busy channels after the lapse of a measured idle interval; this feature is of general utility and application in many types of telegraph systems.

In the present arrangement provision is made for the prevention of mutilation of an interconnection when two partners attempt interconnection simultaneously. To achieve this a directional dominance feature is included in the present system by means of which, when two partners attempt interconnection simultaneously, the switching apparatus at one terminal is given preference for an interval until connection is established.

A further feature of the invention, therefore, is a directional dominance arrangement to prevent mutilation of connections attempted simultaneously by two partners.

These and other features will become apparent from the following description when read with reference to the associated drawings, in which:

Figs. 1, 2 and 3 taken together show the patron's loop, code selecting, transmitting and receiving equipment at the west terminal, and Figs. 4, 5 and 6 show the corresponding equipment at the east terminal.

Fig. 7 shows the disposition of Figs. 1 to 6 to form an operative system.

GENERAL DESCRIPTION

Before proceeding with the detailed description of the system, it will be described in a general way to facilitate an understanding of the detailed description to follow.

In the lower left portion of Fig. 1 are shown the station loop and terminating apparatus for two teletypewriter patrons' stations A and B. It is to be understood although but two are shown a larger number, such as 10, 20, or more, may be interconnected by means of the present equipment. At the upper left of Fig. 1 are shown two telegraph transmitting relays 1 and 2. It is to be understood that the two relays shown are typical and that ordinarily a larger number corresponding to the number of channels employed to interconnect the two areas will be used. Two telegraph channels 3 and 4, are shown interconnecting transmitting relays 1 and 2, respectively to the distant terminal where they extend through the windings of receiving relays 5 and 6, respectively. At the east terminal two patrons' circuits, serving patrons A' and B' are shown at the lower right of Fig. 4. Two transmitting relays 326 and 327 are indicated at the upper right of Fig. 4 and two telegraph channels 7 and 8 interconnect the armatures of these relays to the windings of receiving relays 9 and 10, respectively of the west terminal at the upper right of Fig. 3. The code transmitting relays 11 to 14 which establish the codes identifying the distant partners are shown in a vertical row in the middle of Fig. 2. Each of these relays is individual to a particular patron at the west terminal and each is arranged to set up for transmission to the east terminal a code identifying the corresponding patron's partner at the distant terminal.

In a previous cycle of operation channel 3 has been pre-selected in a manner to be described and is awaiting the service of the next patron requiring interconnection to his distant partner. In order to establish such interconnection a particular patron, such as patron A, will operate his break key 18, whereupon a coding relay 11 which is arranged to establish the code corresponding to patron A' at the distant terminal will always be operated. The operation of relay 11, which is individual to patron A, will impress the code identifying patron A' on transmitting distributor 17. Transmitting distributor 17 will simultaneously be set into operation to transmit the code of patron A' to the distant central terminal over preselected trunk 3 to the receiving relay 5 associated therewith. Receiving relay 5 will in turn impress the received code identifying patron A' on receiving distributor 19 which will in turn transfer the code to relays 21 to 25. Certain of this group of relays will be operated in correspondence with the received code to effect a single selection identifying the connected local station of patron A' through the operation of relay 26 individual to patron A'. Thereupon the channel 3 over which the identifying code has been transmitted will be extended through conductor 27 and contact 28 to conductor 29 which extends through the teletypewriter equipment associated with patron A' in the east. Then patron A may transmit to patron A' by operating his teletypewriter transmitting keys. The patron code transmitting equipment at the west terminal and the patron code receiving equipment at the east terminal will be disconnected from channel 3. A new channel will be preselected at the west terminal and at the east terminal this channel will be connected to the receiving code distributor and decoding equipment. If any of the patrons at the east terminal wishes to be connected to his partner at the west terminal it may be done in a corresponding manner.

It is pointed out that the teletypewriter patrons A, B, etc. at the west terminal will be located in various local business offices in the general vicinity of the west terminal switching station and will be connected by individual pairs of conductors such as 30, 31 or 32, 33, etc., to the western switching terminal whereat the switching equipment shown in Figs. 1, 2 and 3 is located and correspondingly the patrons, such as A' and B', will be similarly connected by means of pairs of conductors from their respective local stations to the east terminal where the switching equipment, per Figs. 4, 5 and 6, is located.

Channels 3, 4, 7, 8, etc., will interconnect the eastern and western terminals. These channels are arranged for one-way communication only. It is particularly pointed out that although one-way polar channels are indicated as interconnecting the eastern and western terminals they are so shown for illustrative purposes only and, in practice, half duplex or full duplex open wire or cable circuits, direct current, alternating current or carrier facilities may be employed and ordinarily in a particular connection combinations of these will be employed. Channels 3, 4, 7 and 8 will ordinarily extend through repeater circuits forming no part of the present invention and therefore not illustrated.

DETAILED DESCRIPTION

*Connection of calling subscriber to line*

Figure 1:
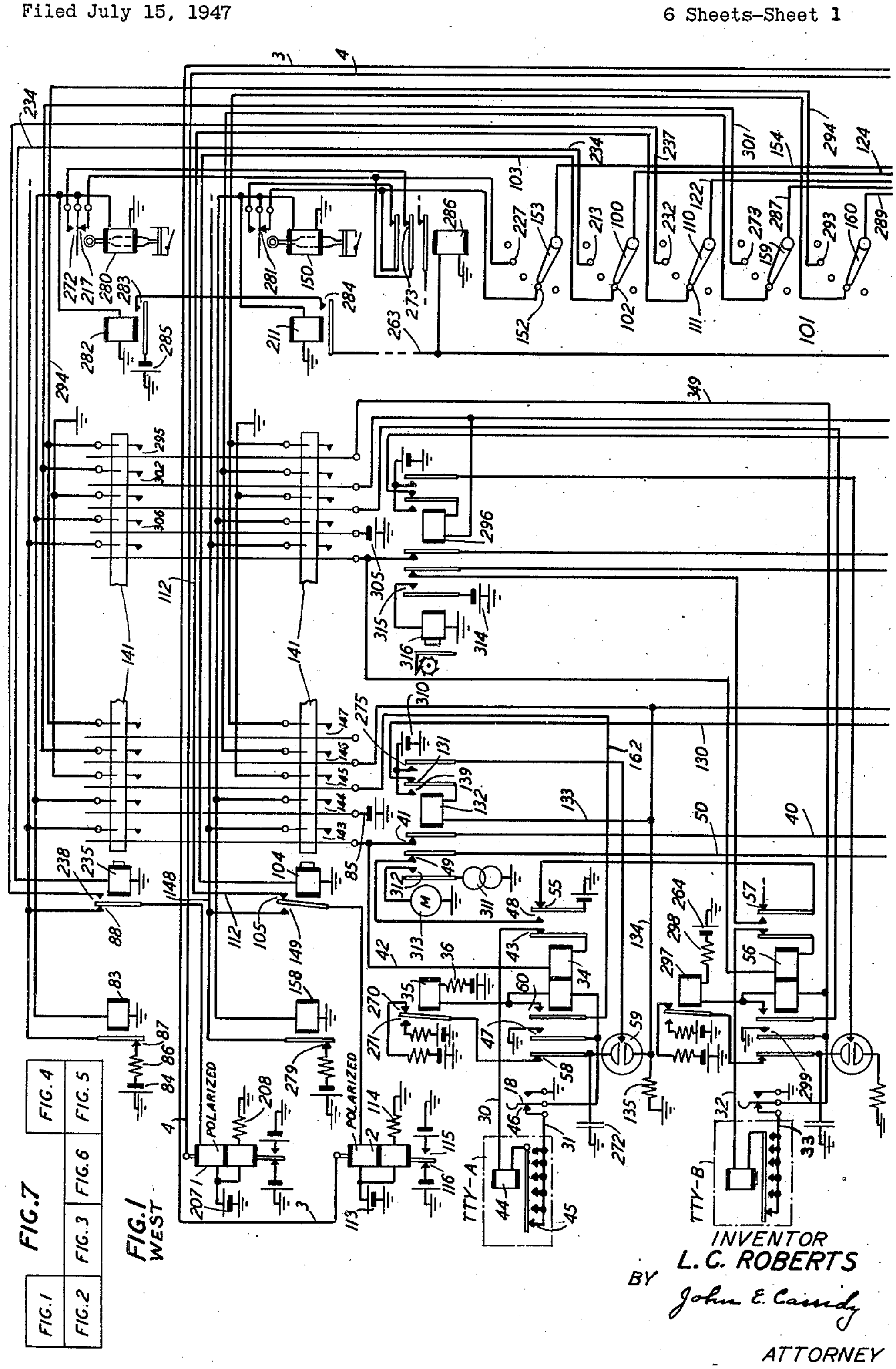

When the patron A at the west terminal wishes to transmit, key 18 is actuated to engage with its opposite contact. A circuit is then established from ground through the right-hand make contact of key 18, the left-hand winding of relay 34, the winding of relay 35, resistance 36 and through battery to ground operating relay 34 and releasing relay 35 which is normally operated as shown. Relay 34 is a differential relay which is normally in the balanced condition as a result of current flowing through both its right and left-hand windings over a circuit which may be traced starting at grounded positive battery 37 at the left of Fig. 3 through resistance 38, contact 39, conductor 40, which connects to conductor 40 in Fig. 2 and extends through conductor 40 and contact 41 in Fig. 1, conductor 42, right-hand winding of relay 34, contact 43, conductor 30, teletypewriter receiving magnet 44, teletypewriter transmitting contacts 45, conductor 31, contact 46, left-hand winding of relay 34, winding of relay 35 and resistance 36 to grounded negative battery. Relay 35 is normally operated over this path. The actuation of key 18 to its opposite contact upsets the balance in relay 34 by opening the path through the right-hand winding of relay 34, and actuates relay 34. Reduced current flows through the single winding of relay 35 as a result of the disconnection of positive battery 37 and relay 35 releases. The closure of contact 47 locks relay 34. The closure of contact 48 establishes a circuit from battery through contacts 48 and 49, conductor 50, into Fig. 2, where the circuit extends through contact 51, winding of relay 11, contacts 52, 53 and 54 and the winding of relay 15 to ground actuating relay 11. The opening of the right-hand break contact 55 of relay 34 disconnects battery from a chain circuit extending through the right-hand make contacts of relays, such as 56, corresponding to relay 34 and associated with other patrons at the west terminal. The reason for this is to prevent the operation of any other individual code relay, such as 11, corresponding to any other patron at the west terminal. It is essential that only one coding relay, such as 11, designating a particular patron at the distant terminal be operated at any one time. By opening the chain circuit extending from battery through contacts 55, 57, etc., this is prevented.

When any other patron at the west terminal wishes to transmit to his partner at the east terminal he will actuate his key corresponding to key 18 and in response thereto the operation of the relay corresponding to relay 34 will extend the battery supplied from contact 55 through a contact corresponding to contact 48 in a circuit similar to that traced for relay 11 through the individual coding relay such as 12, associated with the particular station. It is pointed out that the relay corresponding to relay 34 which is nearer relay 34 in sequence will obtain preference in the chain circuit. The opening of contact 43, when relay 34 is operated, opens the loop through the circuit of patron A. Contact 58 is opened to disconnect battery through the contacts of relay 35 from the cold cathode gas tube 59 which controls the automatic disconnection of an idle patron's loop after communication is ended, which will be described hereinafter.

The closure of contact 60 is ineffectual at this time. It is pointed out that contacts 52, 53, 54, etc. in Fig. 2 are in series, and the operation of any coding relay, such as 12, 13 or 14, prevents the operation of any relay in position above it in the chain. Therefore, the combined action of the contacts of relays, such as 34, 56, etc. and 11, 12, etc. insures the operation of not more than one code relay at a time. If two patrons connected to a particular terminal operate their breaking keys, such as 18, nearly simultaneously, the two corresponding code relays, such as 11 and 12, may operate for an instant but the code relay associated with the patron in a preferential position in the chain circuit of Fig. 1 will quickly take precedence. Relay 15, shown in the lower middle portion of Fig. 2, is slow to operate. Any code relay, such as relay 11, upon being operated locks in a circuit which extends from battery 61 through contact 62, contact 63, winding of relay 11, contacts 52, 53 and 54 through the winding of relay 15 to ground. The circuit is arranged so that contacts, such as 63 of the coding relays, close before contacts, such as 51, open to insure the locking of the code relay. When relay 11 operates a circuit may be traced from grounded positive battery 64 through resistance 65, contact 66, conductor 67 which extends into Fig. 3 to the grounded side of the winding of the receiving holding relay 68 individual to patron A, releasing it if it is in the operated condition as a result of operation in a previous cycle in response to a break signal from patron A's distant partner, which may be understood from the following. The operation of relay 15 establishes a circuit from ground through contacts 69, winding of relay 70 to open contact 72, as relay 71 is unoperated at this time. The operation of relay 15 establishes a circuit from battery through contact 74, contact 75, contact 76, contact 77, relay 78 being operated in a manner to be described hereinafter, and through the winding of start magnet 79 to ground energizing the start magnet. This actuates lever 80 against the tension of spring 81 withdrawing it from the path of rotating arm 82. Rotating arm 82 of transmitting distributor 17 is driven by a motor, not shown, through a friction clutch, not shown, in a manner well understood in the art. Upon the withdrawal of lever 80 the rotating arm sweeps in a clockwise direction across the face of the distributor.

There are four sets of rings on transmitting distributor 17. The outer ring is divided as indicated into seven conducting segments each insulated from the other. The ring 90 is a continuous solid conducting ring. Ring 91 has a short conducting segment 92 in the position indicated. The balance of ring 91 is an insulating segment. Ring 93 is a solid continuous conducting ring. There are two sets of brushes on the distributor. The outer pair of brushes 94 and 95 are interconnected. The inner pair of brushes 96 and 97 are also interconnected. The respective pairs of brushes are insulated each from the other.

Figure 2:
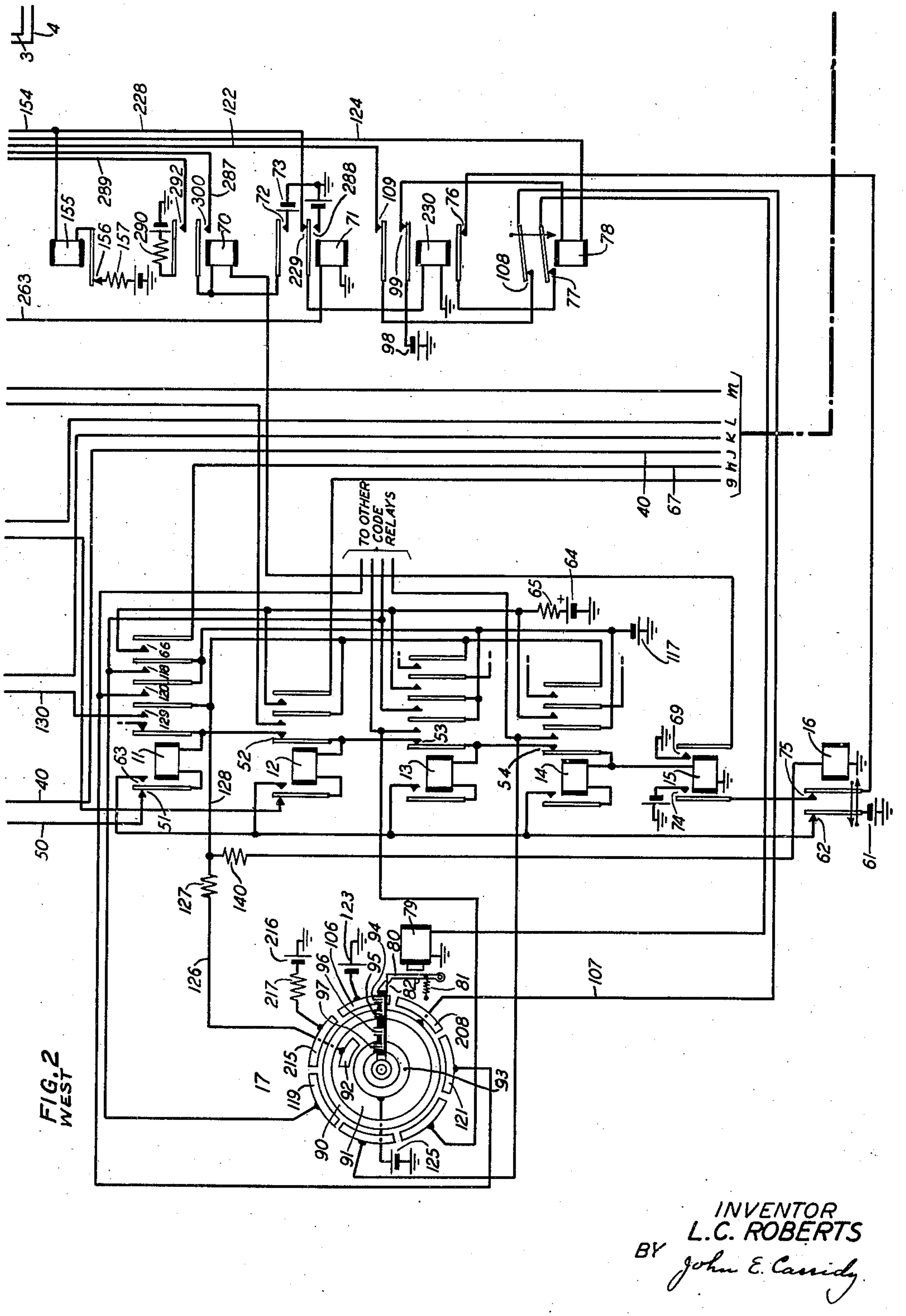

As a result of the preselection of a channel in a previous cycle, in a manner to be described, a circuit extends from grounded battery 98, at the middle right in Fig. 2, through contact 99, winding of relay 78, conductor 124, into Fig. 1, contact arm 100 of selector 101, contact 102, conductor 103 and the winding of relay 104 to ground. Relays 78 and 104 are operated in this circuit. Contacts 77, 108 and 105 are therefore closed. When the rotatable arm 82 is in the stop position as indicated, brush 94 is in engagement with stop segment 106 and a circuit may, therefore, be traced from negative battery 123 through segment 106, brush 94, brush 95, ring 90, conductor 107, contact 108, contact 109, conductor 122, into Fig. 1, contact arm 110, contact 111, conductor 112, contact 105 and the top winding of relay 2 to positive battery 113. Relays such as 2 are equipped with a biasing circuit extending from positive battery 113 through the bottom winding of relay 2 and resistance 114 to ground. The effect of this current tends to actuate the armature of relay 2 to the right to engage with its right-hand or spacing contact 115. However, the effect of the current in the upper winding of relay 2 is dominant and the armature of relay 2 for this condition is actuated to engage with its left-hand or marking contact 116 so that a marking signal is being transmitted over the selected trunk 3 during the interval after preselection is completed and while it is awaiting seizure for use in communication between patrons.

Each of the coding relays, such as 11, 12, etc. is equipped as indicated on its right-hand side, with sets of contacts which are connected to various segments on the outer ring of transmitting distributor 17, so as to effect the transmission of a particular code identifying the corresponding patron in the distant city when the distributor 17 is operated. For instance, in the case of relay 11, which is individual to subscriber A at the west terminal, certain of the right-hand contacts establish the code identifying patron A' at the eastern terminal. Relay 12, individual to subscriber B, is arranged to establish the code identifying patron B' at the eastern terminal and so on. When relay 11 is operated parallel circuits may be traced from negative battery 117 through contact 118 to segment 119 and through contact 120 to segment 121. Corresponding contacts of the other relays such as relays 12, 13, etc. will be connected to various segments of the distributor in a like manner in accordance with individual code combinations required to be established for the selection of the corresponding distant patron. As the rotatable arm 82 rotates in a clockwise direction over the face of the distributor, negative battery 117 will be extended through the segments such as 119 and 121 and brushes 94 and 95 through ring 90 and conductor 107 over the circuit heretofore traced through the top winding of relay 2. In the case of segments which are not connected to negative battery 117 the circuit through the top winding of relay 2 will be open. The armature of relay 2 will be actuated to its left-hand or marking segment when the circuit is closed and to its right-hand or spacing contact, under the influence of its biasing winding, when the circuit is open. As a result of this the code combination identifying patron A' will be transmitted over channel 3 to the eastern terminal where it will be impressed on receiving relay 5. When brush 96 engages segment 92 a circuit will be established from positive battery 125 through ring 93, brush 97, brush 96, segment 92, conductor 126 and resistance 127 to parallel branches. One branch extends through conductor 128, contact 129, conductor 130, into Fig. 1, contact 131, winding of relay 132, conductors 133 and 134 and resistance 135 to ground operating relay 132. When relay 132 operates it is locked from positive battery 310 through contact 139. Contact 139 is arranged to make before contact 131 breaks. The parallel circuit may be traced through resistance 140 and the winding of relay 16 to ground operating relay 16. Relay 16 is slow to operate and slow to release. It is slow to operate to insure the operation of relays such as 132 after the distributor brushes 96 engage segment 92 before relay 16 operates and opens the path to relay 132 by unlocking the corresponding code relay 11. It is slow to release to insure the release of all coding relays before contact 62 is reclosed. The operation of relay 16 unlocks relay 11 by opening contact 62 and relay 11 releases.

Figure 3:
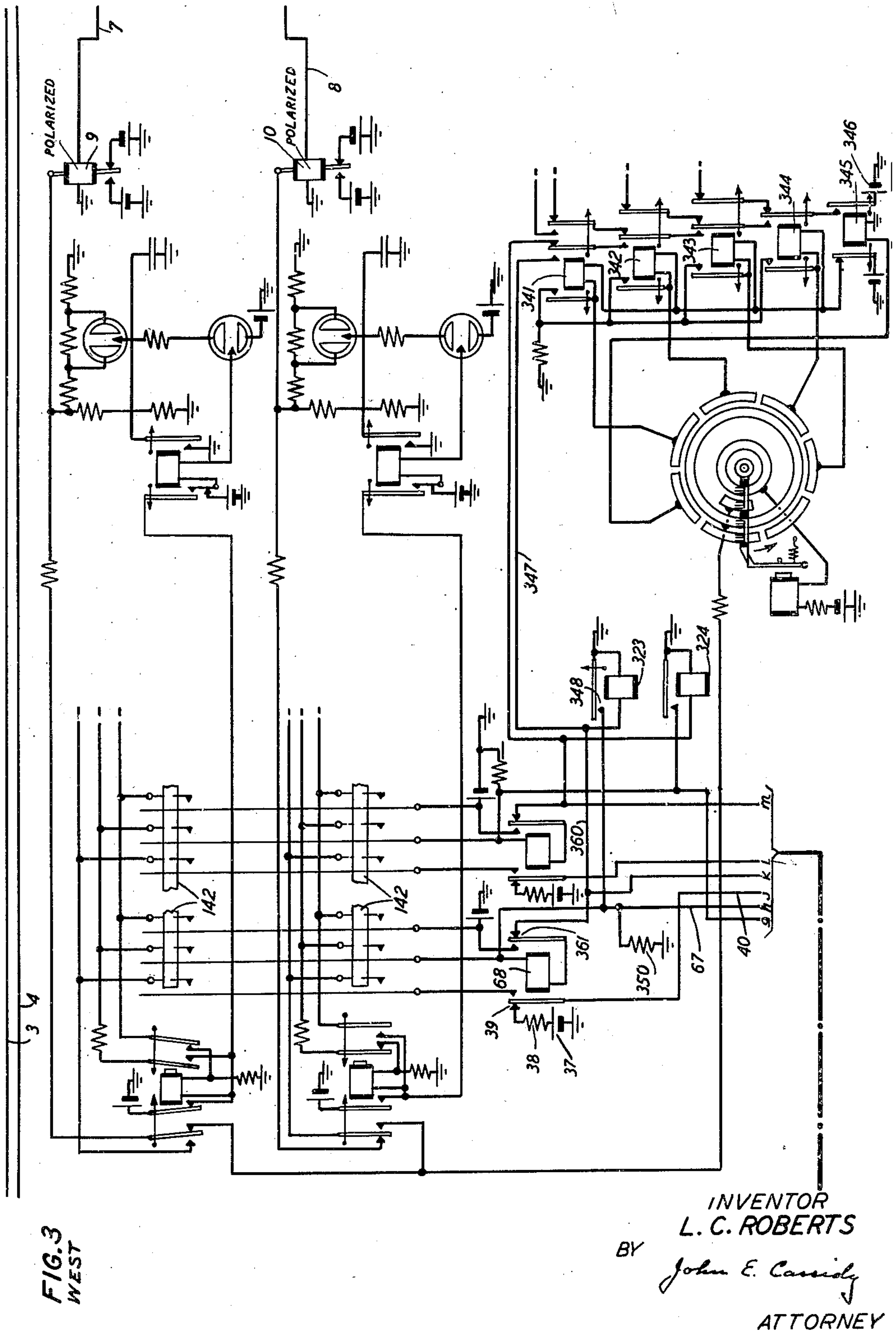

A cross bar switch such as 141, Fig. 1, is employed in connection with the transmitting equipment and a second cross bar switch such as 142, Fig. 3, is employed in connection with the receiving equipment at each switching station. Such switches are well known in the art and are described, for instance, in Patent 1,953,503, J. N. Reynolds, filed April 3, 1934, and Patent 1,303,084, F. A. Lundquist, filed May 6, 1919. Each cross bar switch is equipped with a number, such as 10, relays, each of which is individual to a particular horizontal row of contacts of the switch. The operation of any one of these relays is effective to control the corresponding horizontal row of contacts in the cross bar switch. Each cross bar switch is equipped also with a number, such as 10, relays, which control the operation of a particular group of contacts in a vertical row of the switch. The previous operation of relay 104 has conditioned the corresponding horizontal row of contacts so that, when relay 132 operates, the left-hand group of contacts opposite horizontal relay 104 are closed, that is, contacts 143 to 147 inclusive are closed. The closing of contact 143 establishes a path from conductor 42, through conductor 148 to open back contact 149. The closing of contact 144 establishes a path from negative battery 85 through contact 144 to four parallel branches. One branch extends through the winding of relay 150 to ground. Relay 150 is a slow to operate relay which may, for instance, be of the dash-pot type. The operation of this relay will be described in detail hereinafter. Another branch extends through the winding of relay 211 to ground operating relay 211. The effect of this will also be described hereinafter. A third branch extends through contacts 281 and 152, switch arm 153, conductor 154, winding of the selector stepping magnet 155, contact 156 and resistance 157 to positive battery. The fourth branch extends through the winding of relay 158 operating relay 158. While any channel, other than the preselected channel, is idle, relays such as relays 104 and 158 are released and contacts corresponding to contacts 149 and 279 are closed to maintain the channel in the marking condition by connecting negative battery to the right-hand terminal of the top winding of the relay such as relay 2. Stepping magnet 155 is energized, rotating all of the switching arms 153, 100, 110, 159 and 160 of selector switch 101, which is well known in the art, in unison to the next adjoining contact in a clockwise direction. When switch arm 100 disconnects from contact 102, relay 104 is deenergized. Contact 105 is opened and contact 149 is closed. This connects conductor 42 from the teletypewriter loop of patron A through to sending relay 2.

It will be remembered that relay 34 was locked in the operated position when key 18 was operated, while the code designating patron A' was transmitted to the distant east terminal. Relay 34 is now released through the closure of contact 145 which connects ground through contact 145, conductor 162 and contact 60 to the upper terminal of the left-hand winding of relay 34 as ground is also connected to the bottom terminal of the same winding through locking contact 47 while the right-hand winding of relay 34 is open at contact 43 of relay 34 while relay 34 is operated. This closes the loop circuit of teletypewriter patron A. The circuit may be traced from grounded negative battery through resistance 36, winding of relay 35, left-hand winding of relay 34, contact 46, teletypewriter transmitting contacts 45, teletypewriter receiving magnet 44, conductor 30, contact 43, right-hand winding of relay 34, conductor 42, contact 143, contact 149 and the top winding of relay 2 to positive battery 113.

*Connection of receiving subscriber to line*

The manner in which patron A' is connected to channel 3 at the distant station in response to the reception of his particular code signal combination transmitted by his partner patron A, will now be described.

As a result of the operation of the receiving selecting equipment at the east terminal on a previous cycle, a path has been established interconnecting channel 3 to the receiving distributor 19. The manner in which the path is established will be made apparent hereinafter. While the armature of any transmitting relay, such as relay 2, is in engagement with its left-hand or marking contact the armature of the corresponding receiving relay, such as relay 5, will be in engagement with its left-hand or marking contact 137. The code signals incoming to the east terminal actuate the armature of relay 5. In response to the first signal element of a patron selecting code combination, which is always a spacing signal element, as first segment 203 of distributor 17 in Fig. 1 is not connected to battery, the armature of relay 5 is actuated to the right so as to be connected through contact 240 to positive battery. This establishes a path from positive battery through contact 240, resistance 164, contact 165, which is closed through the operation of relay 166 which was selected in a previous cycle in a manner to be described, conductor 167, resistance 168, conducting ring 169 which is connected to conducting segment 178, brush 170, brush 171, solid conducting ring 172, conductor 173, winding of distributor start magnet 174 and resistance 175 to negative battery. Receiving distributor 19 has four rings. The outer ring is divided into seven segments corresponding to the seven segments of the transmitting distributor 17. The next inner ring is a solid continuous conducting ring. The next ring in order proceeding towards the center of the distributor has one active conducting segment only, segment 178, in the position indicated and the innermost ring 172 is a solid conducting ring. The rotatable arm 180 is equipped with two pairs of brushes, the units of each pair being individually interconnected, that is to say brush 177 connects to brush 176 and brush 170 connects to brush 171. Stop lever 182, under control of magnet 174 and restoring spring 183, is interposed in the path of rotatable arm 180 so that arm 180 is normally arrested in the position indicated. In the stop position, segment 178 is connected through brushes 170 and 171 to the inner conducting ring 172. When magnet 174 is energized, in response to the first signal element of a code combination, stop lever 182 is withdrawn from the path of rotatable arm 180 which rotates in a clockwise direction over the face of the distributor. The transmitting distributor 17 and the receiving distributor 19 are arranged so that their times of rotation are equal. The segments of the outer ring of each are equal in number and in corresponding positions on each distributor. Corresponding segments on the outer ring of each distributor are of equal lengths. The signals transmitted from distributor 17 are impressed through relay 5 on ring 169 of receiving distributor 19 and as arm 180 rotates the signals are impressed through corresponding segments of the outer ring of distributor 19 through the windings of relays 21 to 24, dependent upon the particular code. Circuits may be traced from the segments of the outer ring of distributor 19 through the windings of individual relays of the group 21 to 24, inclusive, and contact 185 to positive battery 186. Such of these relays as are operated in accordance with the received patron's selecting code combination are locked over a path from ground through resistance 187 and contacts corresponding to 188 through the respective winding of the operated relays and contact 185 to battery 186. The code of the called patron A' is established on the contacts of relays 21 to 24.

When brush 94 of distributor 17 in Fig. 1 engages the sixth segment 215, negative battery 216 is always connected through resistance 217, segment 215, brushes 94 and 95, ring 90 and conductor 107, over a path heretofore traced through the top winding of relay 2 to positive battery, to transmit a marking signal to the eastern terminal. This marking signal is impressed through the sixth segment 200 of distributor 19 through the winding of relay 25 operating relay 25. As a result of this, an individual selecting path is established for each different patron's combination from battery 190 through contact 201 and the contacts of relays 21 to 24 in accordance with the received code combination, to a conductor such as 191, which particular conductor is individual to the called patron A'. The circuit continues through an individual path depending upon the selection, such as the path through contact 192, conductor 193, conductor 194, contact 195, winding of the selecting relay 26, corresponding to patron A', and through resistance 197 to ground operating relay 26. When relay 26 operates, it is locked from battery 219 through contact 198. Contact 198 closes before contact 195 opens to insure locking of relay 26. The operation of relay 25 disconnects battery 186 from the windings of such of the code relays 21 to 24 as have been operated. Each of relays 21 to 24 is a slow-to-release relay to insure the operation of the relay such as 26 before the established code is wiped out through the release of such of relays 20 to 24 as have been operated. Relay 25 is released after brush 177 sweeps off segment 200. Arm 180 is arrested in the stop position indicated by stop lever 182 which has been withdrawn by spring 193 upon the deenergization of magnet 174.

Figure 4:
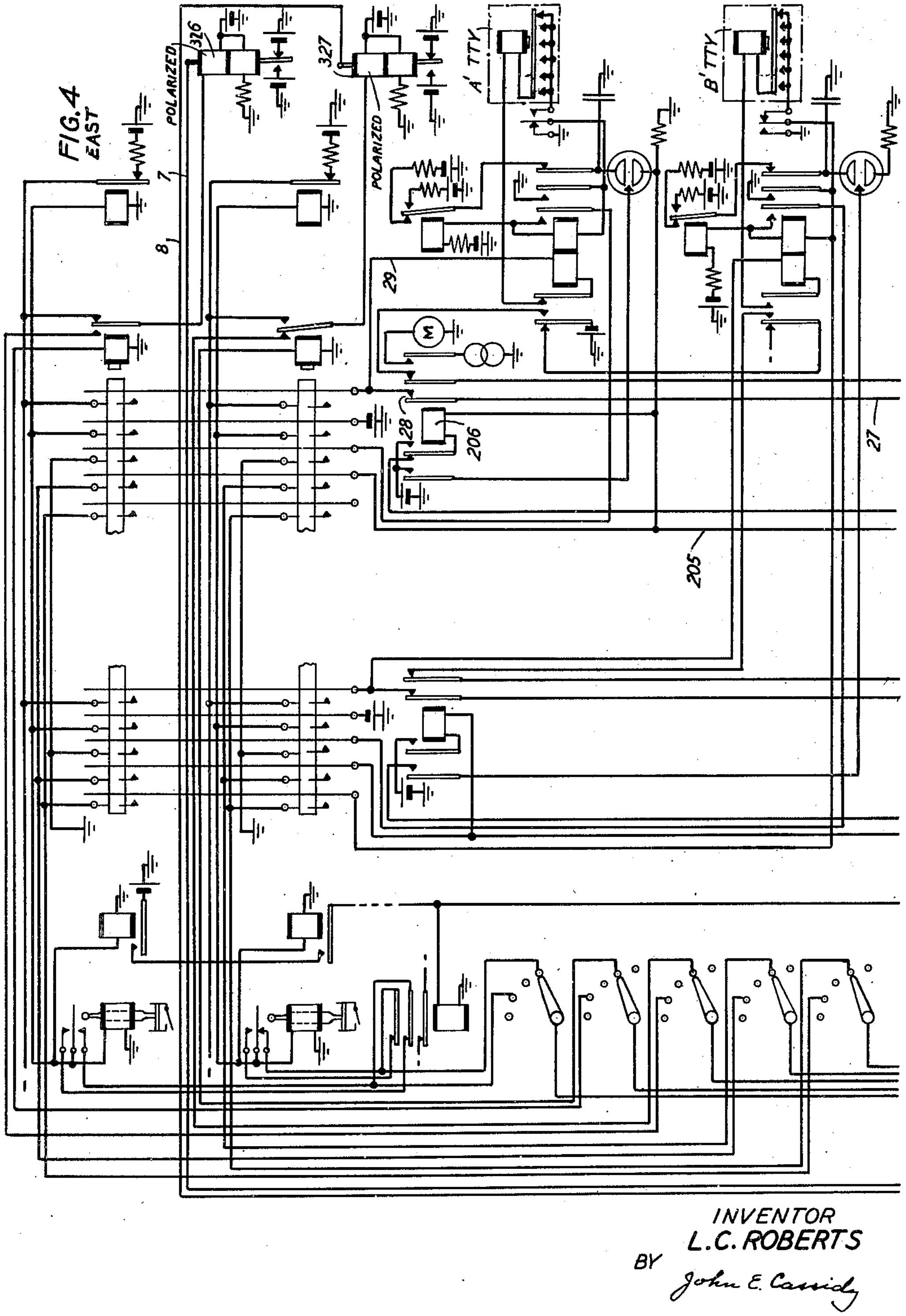
Figure 5:
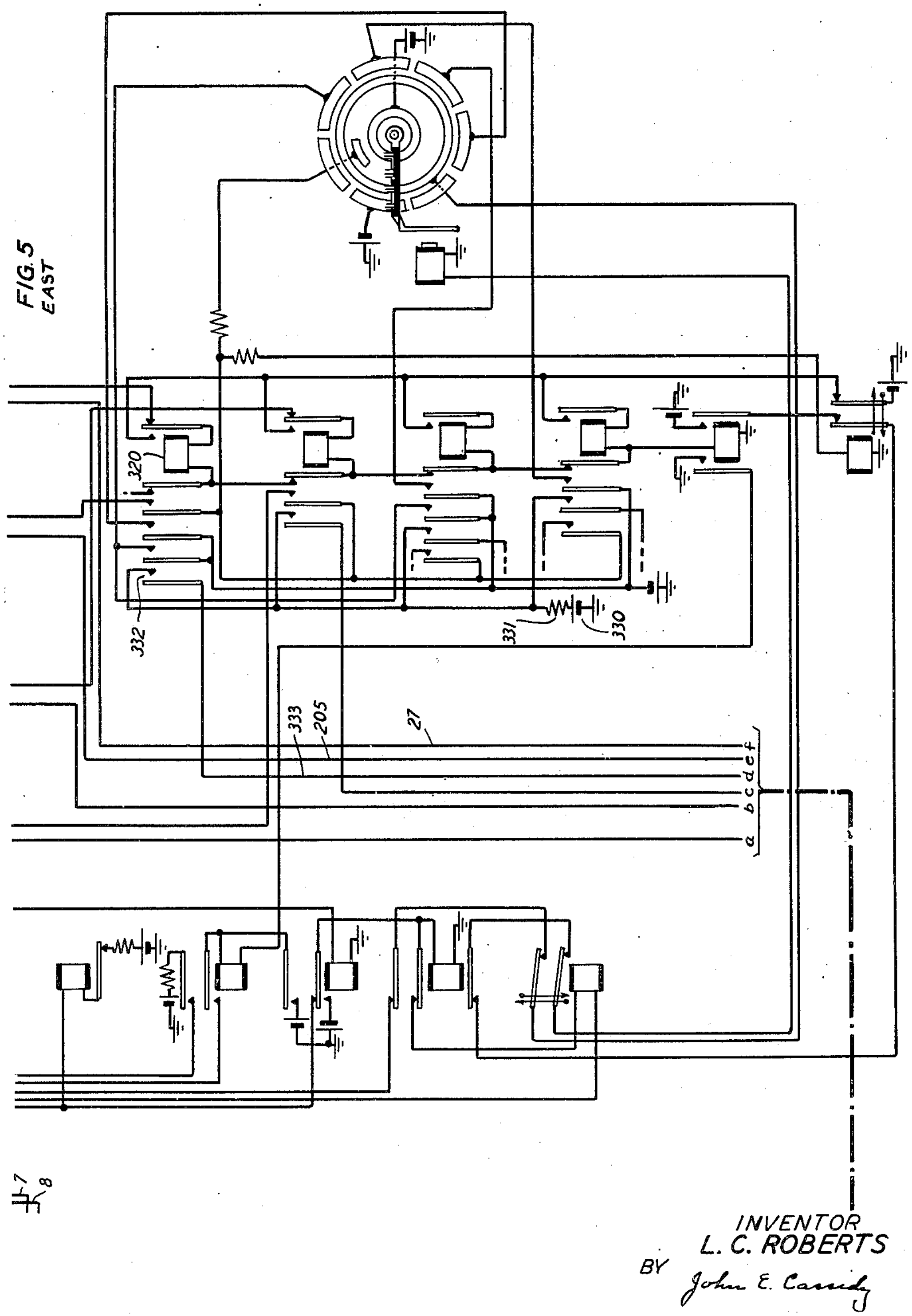

The selecting path such as that through conductor 191, contact 192 and conductor 193 which operates relay 26 has a parallel branch extending through conductor 205 in Figs. 5 and 4 to the lower or grounded terminal of relay 206 which is individual to patron A' and corresponds to relay 132 at the west terminal. This releases relay 206 if it is in the operated condition as a result of a call inaugurated by patron A' on the last preceding cycle of operations of the individual equipment of patron A and A'.

When relay 166, which is individual to channel 3 at the upper right in Fig. 6, operated on the previous cycle, in a manner to be described, it conditioned the terminals in the corresponding horizontal row of terminals for connection upon the operation of any of the vertical control relays corresponding to relay 26, associated with the individual patrons. The operation of relay 26 closes contacts 220, 221 and 222. The closing of contact 220 establishes a path from negative battery 219 through contact 220 and contact 223 to the left-hand or grounded terminal of relay 166 releasing relay 166; contacts 220, 221, 222 remain closed until the release of relay 26. The closing of contacts 224 and 222 establishes a path from the armature of relay 5 through contact 224, contact 222, contact 225 to conductor 27 which extends through Figs. 5 and 4, contact 28 and conductor 29 through the loop circuit of patron's A' teletypewriter, the circuit for which corresponds to that traced for patron A in Fig. 1, thus interconnecting patron A and patron A' so that communication may proceed.

*Selecting idle channel*

The manner in which an idle channel is preselected will now be explained. Returning to the sending portion of the circuit at the west terminal it will be recalled that the switch arms associated with selector swith 101 were stepped off the terminals associated with selecting relay 104 and transmitting relay 2. Each channel which is busy at the moment, and has not been busy long enough to be pre-empted, in a manner to be described, will have battery such as 85 connected through contacts such as 144 and 281 to a terminal such as 152 on the switch bank served by rotatable arm 153. When arm 153 engages any such terminal it will be stepped off the terminal immediately through the operation of stepping magnet 155 of switch 101. When switch arm 153 engages a terminal to which no battery is connected, magnet 155 will not be energized and the switch will stop. All switch arms will simultaneously engage contacts in corresponding positions on their respective banks. During the rotation battery connected to each engaged terminal served by rotatable arm 153 will be extended through conductor 154, conductor 228, contact 229 and the winding of relay 230 to ground operating relay 230. The operation of relay 230, by opening contacts 76, 99 and 109 opens the path to start magnet 79, opens the path to the various channel selecting relays such as relay 104, and opens the path extending from transmitting distributor 17 through conductor 107, by means of which the various code combinations are transmitted. When switch arm 100 engages a terminal to which negative battery is not connected, the stepping of switch 101 ceases and relay 230 releases. It will be assumed that the arms of switch 101 stop on contacts corresponding to contact 227 on the bank served by rotatable arm 153. A circuit will then be established from battery 98, in the lower right-hand portion of Fig. 2, through contact 99, winding of slow-to-operate relay 78, conductor 124, into Fig. 1, switch arm 100, contact 213, conductor 234 and the winding of relay 235 to ground operating relay 235. Another circuit is also established which extends from negative battery 123, segment 106, brushes 94 and 95, solid ring 90 and conductor 107 to contact 108 which remains open for a predetermined interval, longer than a code signal, which interval will be assumed to be about two seconds while slow-to-operate relay 78 is operating, and then is extended through contact 109, conductor 122, into Fig. 1, switch arm 110, contact 232 and conductor 237, contact 238 associated with the selected relay 235 and through the top winding of relay 1 to positive battery. Relay 78 is a slow-to-operate relay and so the circuit of the newly selected channel is interrupted until relay 78 operates. Since, as was described above, distributor 17 is not operated until after a particular patron such as patron A breaks and relay 15 is thereafter operated, distributor 17 will be maintained in the idle condition while preselection of an idle channel is effected.

A steady space signal is transmitted to the east terminal from relay 1 immediately after a new idle channel is selected and while the path through the top winding of the transmitting relay such as relay 1 is open at contact 108. During this interval the armature of relay 1 will be under the influence of its bottom or biasing winding which operates its armature to the right to engage its spacing contact. This space signal persists for an interval of approximately two seconds while relay 78 is operating. At the end of this interval contact 108 closes establishing the circuit through the top winding of relay 1 which actuates the armature of relay 1 again to the left to reestablish the marking condition. This completes preselection of an idle channel at the western terminal except for its appropriation for use by the next western patron to break in a manner heretofore described. There remains to be described, however, the manner in which the receiving end of the channel which has been selected at the western terminal is connected to the decoding apparatus at the eastern terminal.

The steady space signal of about two seconds duration is transmitted over channel 4 to the east terminal where it is impressed on relay No. 6. In response to this the armature of relay 6 is actuated to engage its right-hand or spacing contact 212 and positive battery is connected through contact 212 and resistance 241 to the upper terminal of condenser 242. The potential on the condenser is applied through resistance 243 to an electrode of cold cathode gas tube 244. After an interval depending upon the capacity of the condenser and the magnitude of the resistances, the control gap of cold cathode gas tube 244 will break down, establishing a circuit from positive battery 245 through contact 246, relay winding 248 across the main gap of the tube to grounded negative battery 247 operating relay 248.

It is particularly pointed out that the longest possible spacing signals received during normal teletypewriter communication are of relatively short duration compared to the two-second spacing channel selecting interval and the small positive charge accumulated on the condenser, such as condenser 242, due to such signals will discharge through cold cathode gas tube 317 in response to the difference in potential applied across resistance 262 to the control electrodes of tube 317 from negative battery 138 due to the next marking signal.

When relay 248 operates contact 249 closes before contact 246 is opened. The closing of contact 249 establishes a circuit from positive battery 245 through contact 249 and conductor 250 to junction point 251. Before the operation of relay 252 in a manner to be described, a circuit extends through contact 253, resistance 254, to conductor 255 which is connected in parallel to all contacts such as 256 and 257. If any relay, such as 26, individual to a patron's loop circuit which was last connected to receiving relay 6, is operated, the circuit will be completed through the corresponding contact such as 256 or 257 to the upper or grounded terminal of the winding of such relay releasing it since positive battery, such as battery 219, will be connected to the opposite terminal of the relay winding. From junction point 251 a parallel circuit extends through the winding of relay 252 and resistance 259 to ground, operating relay 252. The operation of relay 248 also connects ground through contact 260 to the upper terminal of condenser 242 discharging the condenser so that it is in condition to measure the proper interval on the next cycle before the energization of tube 244. Relay 248 is a slow-to-release relay and after an interval it will release since battery is disconnected from its right-hand terminal at contact 246. After a two-second spacing interval the armature of relay 6 is again actuated to engage its marking contact 138. The opening of contact 246 and the discharge of condenser 242 deactivates tube 244 and it remains deactivated. When relay 252 operates it locks through contact 265 to battery 266. The closing of contact 267 extends the incoming line from the armature of relay 6 through resistance 268, contact 267 and conductor 167 to the receiving distributor 19.

As a result of the foregoing series of operations at the west terminal a new transmitting line has been selected and connected to the transmitting distributor 17 so that it is awaiting seizure and the transmittal of a code identifying a patron at the east terminal. At the receiving end of the circuit, the receiving end of the line which has been preselected at the west terminal has been connected to the receiving distributor and the decoding apparatus at the east terminal. The western code transmitting apparatus is awaiting the next break signal, following which the code of the breaking patron's partner will be impressed on the west to east channel. The code receiving apparatus at the east terminal is ready to receive the code identifying the eastern patron and to connect his loop circuit to the selected channel.

*Communication between patrons*

The system is now in condition so that patron A may communicate with patron A'. Patron A may operate the teletypewriter transmitter at his station and the transmitted message will be recorded on teletypewriter receiver of patron A'. The circuit through the top winding of the channel transmitting relay such as relays 1 or 2 and the western patron's loop is closed for marking and open for spacing, actuating the armature of the channel transmitting relay. The channel receiving relay such as relay 5 or 6 at the east terminal follows the signals and impresses them on the receiver in the connected loop circuit.

The operation of the system has been described for a call originating at the western terminal. The apparatus, except for a difference to provide directional dominance, to be described hereinafter, is the same at both terminals. Corresponding apparatus is provided at each terminal. A call originating at the eastern terminal would cause the operation of the corresponding transmitting apparatus at the east terminal and receiving apparatus at the west terminal.

*Subscriber disconnect circuit*

In tracing the loop circuit for patron A it was shown to extend through the winding of relay 35. Relay 35 follows the signals transmitted from the teletypewriter of patron A. It will be remembered that relay 34 is released except while the code of patron A' is being transmitted. The operation of relay 35 impresses positive and negative battery through contacts 271 and 270 and through contact 58 to the right-hand terminal of condenser 272 which is connected in parallel with the upper control electrode of cold cathode gas tube 59. When the sending contacts of teletypewriter 45 are in operation positive and negative battery will be impressed alternately on condenser 272. When the circuit is in the marking condition, as shown, negative battery will be connected through contact 270. If this condition persists for a sufficient interval, condenser 272 will be charged to a potential high enough so that tube 59 will break down. It will be remembered that while any patron's circuit is in operation, the relay corresponding to relay 132 will be operated and battery corresponding to positive battery 310 will be connected through a contact such as contact 275 to the lower control electrode of the tube such as tube 59. When tube 59 breaks down, the potential of the left-hand terminal of the winding of relay 132 is made sufficiently positive so that relay 132 releases since positive battery is also connected to its right-hand terminal. In normal operation, as relay 35 alternately connects negative and positive battery to the top terminal of condenser 272, condenser 272 does not attain a sufficiently high negative potential so that tube 59 breaks down. To insure this the magnitudes of the resistances and of the potentials connected to contacts 270 and 271 may be so chosen that a short engagement of the armature of relay 35 with contact 271 neutralizes the effect of engagement of the armature with contact 270 for a longer interval. Contact 270 will be engaged for a relatively long interval only when the loop circuit is idle. Therefore relay 132 is released after a measured idle interval to disconnect the associated loop and free the connected idle channel so as to make it available to other patrons. The release of relay 132 disconnects positive battery 310 through contact 275 from the main gap of tube 59, inactivating the tube.

The various constants of the subscriber disconnect circuit just described may be chosen so that a patron is automatically disconnected from the line after his circuit has been idle for an interval of any desired duration. This will ordinarily be an interval of two or three seconds.

*Pre-empting circuit*

The present system is arranged so that if no idle channel to a distant terminal is available when a patron desires to transmit, a line which has been busy for longer than a definite measured interval is seized, the patron connected to such line is disconnected and the line is appropriated by the patron wishing to start transmitting.

In order to effect the foregoing each line is equipped with a suitable measuring device for measuring elapsed time. Any one of a number of timing switches known in the art is suitable for such purpose. In the present embodiment the function is performed by a dash-pot relay. Whatever device is employed is arranged to measure the required interval which may, for instance, be one or two minutes or more before operation. The details of the operation of the circuit are as follows.

In describing the operation whereby the loop circuit of patron A was connected to an idle channel to the distant terminal, a circuit was traced from negative battery 85, in Fig. 1, through cross bar contact 144 and the windings of relays 150 and 211 in parallel to ground. Relay 150 is a slow-to-operate relay which may be of the type known in the art as a dash-pot relay, designed to delay operation for the required interval such as one or two minutes or more mentioned in the foregoing. Contact 281 is in parallel with the winding of relay 150, and negative battery 85 is connected through contact 281 while the loop circuit of patron A is connected to the line and before relay 150 operates, and the circuit continues through contact 152, conductor 154, into Fig. 2, winding of stepping magnet 155, contact 156 and resistance 157 to positive battery. When switch arm 153 tests the various contacts on its associated row of terminals for an idle line, it will be stepped off the terminal associated with each line which is continuous through contacts, such as contacts 281 and 144 to negative battery such as 85. Relays such as 211 and 282, in parallel with relays 150 and 280, respectively, are arranged so that they operate immediately upon connection of battery such as battery 85. The contacts of relays 282, 211 and a corresponding relay for each loop, are arranged in a chain circuit extending from battery 285 through contact 283 through the contacts of each of these relays when each of the relays is operated. In order to form a continuous circuit it is necessary that the relay such as 211 associated with each channel be operated or, in other words, that all channels be busy. Thereupon the circuit is extended through the conductor 263 and the windings of relays 286 and 71 in Fig. 2, in parallel to ground, operating both relays.

The circuit is arranged so that a channel cannot be pre-empted and a patron disconnected from a channel even though the channel has been busy for longer than the permitted measured interval unless all channels are busy. This is insured by relay 286 and the associated connections. Each of the time measuring relays, such as relay 280, has an individual circuit shunting contacts, such as contacts 217, which are opened after the lapse of the measured interval. This circuit extends from a front contact, such as contact 272, through a normally closed contact, such as contact 273 of relay 286, which is joined to the conductor normally interconnecting break contact 217 and idle channel indicating terminal such as terminal 152. Relay 286 which is controlled by the chain circuit can operate only if all relays such as relays 211 and 282 are operated which means it can operate only when all channels are busy. Therefore, the single condition of the opening of a contact such as 217 or 281 after the lapse of a measured interval cannot be effective to indicate that the associated channel is available as each such open contact is shunted unless relay 286 is operated. This occurs only when all channels are busy.

When relay 71, Fig. 2, operates, it closes contact 72 and also establishes a circuit from battery through contact 288 and the winding of relay 230 to ground operating relay 230. The operation of relay 230 opens the circuit of start magnet 79. The switch arms of the selector continue to rotate until arm 153 engages the contact of a vulnerable channel where it stops. The vulnerable channel is not pre-empted however, until a break signal is transmitted by a local patron thus operating his respective code relay and relay 15. The closing of contact 69 of relay 15 then operates relay 70 through closed contact 72. This connects positive battery through resistance 290, contact 292, conductor 289, into Fig. 1, switch arm 160 and the contact of the vulnerable circuit such as 293, conductor 294 and a contact such as 295, conductor 349, left-hand winding of a relay corresponding to relay 56, winding of a relay corresponding to 297 and resistance 298 to positive battery, operating relays 56 and 297. The relay corresponding to relay 56 connected to the channel which is to be pre-empted will lock due to the connection of ground through closed contact 299 and the left-hand winding of relay 56. The operation of the relay corresponding to relay 56 opens the loop circuit of the patron who has been connected to the pre-empted channel for longer than the specified interval, while all channels are busy. The opening of the loop prevents the further operation of the teletypewriter of this particular patron thus informing him that his loop has been disconnected from a pre-empted channel.

*Reconnection of patron whose channel has been pre-empted*

The patron who has been disconnected from a pre-empted channel in accordance with the foregoing, will be automatically reconnected to a channel as soon as one becomes available. It will be remembered from the description of the operation of the circuit when patron A started to transmit his partner's code, that relay 132 was operated and locked. A corresponding relay such as relay 296 was operated and locked when the patron such as patron B, whose connected channel has now been pre-empted, started to communicate with his partner. Now that the channel over which he was communicating has been seized for use by another patron, it is necessary that his line holding relay, such as relay 296, be released in order to disconnect his loop and in order that the patron who has lost a channel may have access to another channel. Upon the pre-empting of any line therefore, the vertical channel holding relay corresponding to relay 132 or 296 associated with the patron who has been disconnected from the pre-empted line will be released. This is effected by the connection of positive battery 73, at the right center in Fig. 2, through contact 72, contact 300, conductor 287, into Fig. 1, switch arm 159, contact 273, conductor 301, contact 302 to the left-hand terminal of the winding of relay 296, releasing the relay. The locking of the relay corresponding to relay 56 and the releasing of the relay corresponding to relay 296 establishes the condition whereunder the associated coding relay of the group 11 to 14 will be operated in its proper turn so that the patron whose line has been pre-empted may be reconnected to his partner. This, of course, cannot occur until after the connection of the patron for whom the pre-emption has been effected has been completed because of the chain circuits, heretofore described, controlling the allocation of the code transmitting relays.

The releasing of the holding relay such as 296 also disconnects battery such as 305 from a contact such as 306 and the windings of the relays such as 280 and 282, releasing these relays. The release of relays such as 280 and 282 in turn releases relays 71, 230 and 286, restoring the connections to switch arms 100 and 110 and partly reclosing the circuit to start magnet 79. Battery 98 is then connected through contact 99, winding of slow-to-operate relay 78, conductor 124, into Fig. 1, switch arm 100, contact such as 213, conductor 234 and the winding of relay 235 operating relay 235 which closes contact 238. Prior to the operation of relay 78 a two-second spacing signal will be transmitted to the eastern terminal, since the path through the top winding of the channel transmitting relay to negative battery will be open at contact 108 and at contact 88. The eastern end of the pre-empted channel will be connected to the code receiving apparatus during the two-second interval. After an interval of approximately two seconds, slow-to-operate relay 78 will operate, completing the circuit to start magnet 79 and allowing the code signal for the pre-empting patron's partner to be transmitted to the distant terminal.

After the foregoing cycle of operations has been completed and a channel becomes available, either through release by the subscriber or pre-emption by the automatic timing circuit, the code signal of the particular patron whose line has been pre-empted will be transmitted to reconnect him to his partner.

*Directional dominance*

The present system is arranged so that if a patron at one terminal and his partner at the opposite terminal break simultaneously, a connection will nevertheless be established between them. This is achieved by means of what is called herein a directional dominance feature; that is to say, the circuits are arranged so that the progress of a call through the transmitting equipment at a particular terminal, namely, the eastern terminal, proceeds without interruption to completion at the western terminal under all circumstances. However, if an incoming call to the eastern terminal is registered on the receiving code relays 21 to 25, Fig. 6, after the transmitting code relay such as relay 320, Fig. 5, of the corresponding partner at the eastern terminal has operated, further progress of the call incoming to the eastern terminal is prevented by the operation of a relay such as relay 321, lower middle of Fig. 6, under control of the transmitting code relay such as 320. The eastern terminal equipment dominates in that calls originating at the east terminal proceed in the normal manner to completion at the west terminal, under all circumstances, while calls originating simultaneously by a particular breaking patron's partner at the western terminal cannot be completed at the eastern terminal.

The manner in which directional dominance is achieved is as follows. When a transmitting code relay such as relay 320, Fig. 5, operates at the eastern terminal, a circuit is established from positive battery 330 through resistance 331, contact 332 and conductor 333, which extends from Fig. 5 into Fig. 6 where it connects to conductor 334 and extends through the winding of relay 321 to ground. Each patron at the eastern terminal, as should be apparent from the foregoing, has an individual coding relay such as 320 and connected to each relay such as 320 is an individual relay such as relay 321. If, while relay 320 is operated to transmit the code combination identifying patron A from the east terminal to the west terminal, a code is received at the east terminal and established on relays 21 to 25 identifying patron A', the selecting path individual to patron A' extending from battery 190 in Fig. 6 through the contacts of relays 21 to 25 will be opened at a contact such as contact 192. The operation of relay 321, when relay 320 operates, will open the selecting path to the loop of patron A' by preventing the operation of his receiving selecting relay, such as relay 26, by opening contact 192. The sensitivity of relay 321 must be such that it does not operate from the operate current of relay 26, which divides between relay 26, relay 321 and resistance 197. The selection established on relays 20 to 24 under such conditions is wiped out when brush 177 sweeps off segment 178. In normal operation the receiving selecting relay such as relay 26, will have been operated prior to the wiping out of the selection. When relay 321 is operated, however, the selection of the relay such as 26 is not effected. Relay 321 is slow to release to insure the wiping out of the code on relays 20 to 24 prior to the reestablishment of the selecting circuit through the contact such as contact 192. At the western terminal, the selecting path established by incoming code signals through the contacts of relays 341 to 344 extends directly to the western terminal receiving selecting relays such as relay 68 and does not extend through contacts corresponding to contact 192 at the eastern terminal. When a code combination incoming to the western terminal is set up on relays 341 to 344, Fig. 3, the selecting path extends from battery 346 through the closed contacts in the selecting path, through a conductor such as 347 to a parallel circuit. One branch extends through conductor 360, contact 361, winding of relay 68 and resistance 350 to ground operating relay 68. The other branch extends through the winding of a relay such as relay 323 to ground operating relay 323, which is slow to release. This establishes a circuit from ground through contact 348 to the grounded terminal of the receiving selecting relay 68. This puts a direct ground on the grounded side of the relay rather than the connection to ground just traced through resistance 350, to insure that selecting relay 68 which is associated with the incoming selecting path, does not release prematurely thus insuring the completion of the call to the western partner of the breaking eastern patron.

*Various channel conditions*

At any particular time certain pairs of patrons may be interconnected over certain individual channels and other channels may be idle. In the case of any channel which is not in service the corresponding channel selecting relay such as relay 235 and the corresponding idle channel marking condition relay, relay 83, both at the top left in Fig. 1, will be released. This establishes a circuit from negative battery 84 through resistance 86, contact 87, contact 88 and the top or line winding of the corresponding channel transmitting relay 1 to positive battery 207. Current flowing in this path urges the armature of relay 1 toward its left-hand or marking contact and it is dominant over the counter effect of current flowing in the lower or biasing winding of relay 1 over a circuit from positive battery 207 through the lower winding of relay 1 and resistance 208 to ground. So the armatures of all channel transmitting relays are maintained in the marking condition while the channels are idle. As a consequence of this negative battery is impressed on the corresponding idle channel such as channel 4 and the armatures of all channel receiving relays such as relay 5 in Fig. 6 associated with idle channels are maintained in engagement with their left-hand or marking contacts while the channel is idle.

In the case of channels which are in service as should be apparent from the foregoing, the relay such as relay 235 will be released and the relay such as 83 will be operated. A subscriber's loop circuit such as the loop of patron B will be connected through contacts such as 143 and 88 to the line winding of the channel transmitting relay such as relay 1. Negative battery 264 connected to one end of the patron's loop circuit replaces negative battery 84 and the armature of the transmitting relay such as 1 is maintained in engagement with its left-hand or marking contact for the marking condition.

During communication the loop circuit is closed for marking signals and open for spacing signals.

When the loop circuit is open no current flows through the top winding of the channel transmitting relay and the effect of the current in the biasing winding activates the armature of the relay to the right to engage its spacing contact. At the distant terminal the channel receiving relays such as relays 5 and 6 follow these signals and impress them in turn on the connected loop circuits.

*Metering*

Means are included for indicating the total number of calls made by each patron as well as the total elapsed time a particular patron's circuit is in service on calls which he originates. The first is a cumulative counter 316 which is illustrated connected to make contact 315 of relay 296 individual to patron B. When relay 296 operates battery 314 is supplied through contact 315 and counter 316 to ground. The second is a self-starting telechron clock 313 which is illustrated connected to make contact 312 of relay 132 individual to patron A. When relay 132 operates alternating current is supplied from source 311 through contact 312 and the telechron clock to ground.

What is claimed is:

1. In an automatic telegraph switching system, a plurality of telegraph channels interconnecting a first and a second telegraph switching terminal station, means at each of said stations for automatically extending any of said channels to a calling and a called local station connected individually to each of said terminal stations, preselecting means connected solely to the calling end of said channels for preselecting an idle one of said channels for subsequent service, a control for said preselecting means, said control operable in response to the appropriation of one of said channels for service to preselect another of said channels.

2. In an automatic telegraph switching system, a telegraph channel, a calling local station and a called local station automatically connectable to said channel, means entirely at one of two automatic central switching stations connected in tandem between said calling and said called station for preselecting said channel, means at one of said local stations for thereafter appropriating said channel for communication between said local stations and electrical switches, responsive to said appropriating, for preselecting another channel.

3. In an automatic telegraph switching system, a first and a second automatic central telegraph switching terminal, a first and a second telegraph channel interconnecting said terminals, and channel preselecting electrical switches entirely at said first terminal, directly responsive to the appropriation of said first channel at said first terminal for service, for preselecting said second channel at said first terminal for service.

4. In an automatic telegraph switching system, a telegraph switching terminal, a telegraph channel connected to said terminal, electrical switches at said terminal solely, directly responsive to the release of said channel from service, for completely preselecting said channel for future service, and a telegraph transmitting distributor connected to said switches at said terminal for thereafter impressing a code combination on said channel to direct the extension of said channel.

5. In an automatic telegraph switching system, a plurality of telegraph channels interconnecting transmitting selecting equipment at a first central switching terminal to receiving selecting equipment at a second central switching terminal, channel preselecting means entirely at said first switching terminal, said means comprising electromagnetic multiple switches, and relay controls for said switches responsive to an idle condition imposed directly on an idle one of said channels at said first switching terminal, for preselecting said idle channel for future service.

6. In a telegraph switching system, a local telegraph subscriber station and an outgoing telegraph channel connected to an automatic switching terminal, means entirely at said terminal for automatically seizing said channel for service, means entirely at said terminal for automatically releasing said channel from service, means entirely at said terminal for imposing a condition on said channel when said channel is so released, as an indication that said channel is released, means entirely at said terminal, responsive to the recognition of said condition by preselecting means entirely at said terminal, for preselecting said channel while said station remains in the normal unoperated condition, and an electrical switch responsive thereafter to the actuation of a manually operable key at said station for interconnecting said station and said channel.

7. In a telegraph switching system, a first and second central telegraph switching terminal, a telegraph channel interconnecting said terminals, a telegraph signal repeating device in said channel, and a preselecting circuit connected to said device, said circuit entirely at said first terminal for automatically completely preselecting said channel for future service.

8. In a telegraph switching system a telegraph switching terminal, a telegraph channel connected to said terminal, means at said terminal for generating telegraph code combinations for directing the extension of said channel, means at said terminal for impressing said combinations on said channel, means entirely at said terminal for preselecting said channel for future service, a local telegraph circuit connected to said terminal, a manually operable switch in said local circuit, said switch actuable subsequent to said preselection, and means at said terminal responsive to said subsequent operation of said switch for interconnecting said generating means through said impressing means on said channel.

9. In a telegraph system, a first telegraph channel, a first switch and a first control therefor connected to said channel for preselecting said channel for future service when said channel is idle a second switch and a second control therefor connected to said channel for pre-empting said channel for service when said channel is busy, a second telegraph channel, and a third switch and a third control therefor interconnecting said first and said second controls to prevent pre-emption of said first channel if said second channel is idle and timing means connected to said channels to measure a minimum busy interval before preemption is possible.

10. In a telegraph system, a telegraph channel, automatic switching elements connected to said channel for preselecting said channel for future service while said channel is idle at a first time, a selectively operable control connected to said elements for seizing said preselected idle channel for service at a second time, an automatic preempting switch connected to said channel for seizing said preselected channel for immediate service while said channel is busy as at a third time, timing means connected to said preempted channel to prevent its preemption unless it has been busy for at least a minimum measured interval, other telegraph channels in said system, and a chain circuit interconnecting said control and said switch to prevent said seizure unless all of said channels are busy.

11. In a telegraph system, a telegraph channel, means connected to said channel for communicating over said channel at a first time, means connected to said channel for preselecting said channel for future service, while said means for communicating remains connected to said channel and communication over said channel continues at a second time, timing means connectable to said channel for measuring a minimum interval while said channel is in the communicating condition before said channel may be preempted and pre-empting means for disconnecting said means for communicating from said channel and seizing said channel for immediate service with other communicating means at a third time.

12. In an automatic telegraph system, a plurality of telegraph channels, automatic means for disconnecting a local circuit from a first telegraph channel of said plurality, a dual control for said means, said control including an individual timing circuit connectable to each of said channels and a chain circuit arranged to indicate a simultaneous busy condition of all of said channels, and automatic relay means, responsive to said disconnecting, for reconnecting said local circuit to a second of said plurality of channels.

13. In an automatic telegraph system, a telegraph channel, a telegraph repeater in said channel, a telegraph transmitter and a telegraph receiver connectable to said channel for communicating over said channel, time measuring means connectable to said channel for measuring the duration of the interval while said channel is conditioned for communication and electromechanical relay pre-empting means connectable to said channel, operable upon the lapse of a predetermined interval, for preselecting said channel for future service.

14. A system in accordance with claim 13 including an electromagnetic switch and a manually operable control therefor for deferring the seizure of said channel for actual service until said channel is required for actual service.

15. In an automatic telegraph system, a telegraph channel interconnecting two telegraph central stations, a telegraph signal transmitter and a telegraph signal receiver connectable to said channel, a telegraph signal repeating relay in said channel, said relay connectable to a preselecting circuit and a pre-empting switch in said preselecting circuit for seizing said channel for immediate service.

16. In a telegraph system, a local telegraph subscriber circuit, a telegraph transmitter and a telegraph receiver in said circuit, said circuit connected to a telegraph channel, a telegraph signal repeating relay in said channel automatic means connectable to said relay for pre-empting said channel, timing means connected to said automatic means for timing the interval said channel is busy and automatic means interconnecting said relay and said circuit for disconnecting said local circuit from said pre-empted channel.

17. A system in accordance with claim 16, another telegraph channel, and automatic means, interconnectable between said local circuit and said other channel, responsive to said pre-emption for thereafter reconnecting said local circuit to said other channel.

18. In an automatic telegraph system, a telegraph channel preselecting circuit, a first control connectable to said circuit, a first switch in said control responsive to an idle condition of said channel, a second control connectable to said circuit, a second switch in said second control, responsive to the lapse of a measured interval and a circuit interconnecting said two switches, as a third control of said preselecting circuit.

19. In a telegraph system, a plurality of telegraph channels, a telegraph signal repeating device in each of said channels, a telegraph channel preselecting circuit, an electromagnetic switch interconnecting all of said repeating devices and said preselecting circuit, a first relay in said circuit for preselecting any one of said channels at a first time when all of said channels are idle, and a second relay in said circuit for preselecting a preconditioned one of said channels at a second time when said preconditioned channel is busy and a timing means for timing the interval said predetermined channel is busy.

20. A telegraph system in accordance with claim 19 including a relay in said preselecting circuit for seizing a preselected channel upon the reception of a signal from another circuit connectable to said preselecting circuit.

21. A telegraph system in accordance with claim 19 including a relay in said preselecting circuit for preventing the preselection of said channel when busy if any of said other channels is idle.

22. In a telegraph system, a plurality of telegraph channels, a preselecting circuit connectable to said channels for preselecting one of said channels for future service, a first control and a first switching means, responsive to said first control, both in said circuit for preselecting said one channel for future service at a first time while said channel is idle, a second control and a second switching means, responsive to said second control, both in said circuit for preselecting said one channel for future service at a second time while said channel is busy, a timing means connected to said circuit for timing the interval while said one channel is busy before said one channel is appropriated for other service, and a third control interconnecting said first control and said second control and a third switching means, responsive to said third control, both in said circuit for preventing said selection of said one channel at any time while said one channel is busy if any of said channels is idle.

23. In an automatic telegraph system, a telegraph channel, a telegraph signal repeating relay in said channel a channel extension directing means connectable to said telegraph relay, a channel preselecting circuit connectable intermediate said directing means and said relay, and a channel pre-empting means connected to said preselecting circuit.

24. In an automatic telegraph system, a plurality of local telegraph station circuits connected to a first central telegraph switching terminal, a plurality of local telegraph station circuits connected to a second central switching terminal, a plurality of telegraph channels interconnecting said terminals, means entirely at said first terminal for preselecting one of said channels for future service, means, responsive to the manual operation, subsequent to said preselection, of a control in one of said local station circuits, connected to said first terminal, for thereafter seizing said preselected channel and means responsive to said seizure for extending said channel through said second terminal to a particular one of said local station circuits connected thereto.

25. An automatic telegraph switching system including a local station, a telegraph channel, a telegraph signal repeating relay in said channel, an electromechanical switch for connecting said local station with said telegraph relay at times, a timing circuit for measuring a time interval, and a relay connected to and responsive to said timing circuit for automatically disconnecting said local station from said telegraph relay upon the lapse of a measured idle interval.

26. In a telegraph system, a first and a second automatic central telegraph switching station, a first and a second telegraph channel interconnecting said stations, said channels selectable individually at said first and said second stations respectively and a directional dominance circuit at one of said stations for disabling one of said channels when both are selected substantially simultaneously.

LELAND C. ROBERTS.

REFERENCES CITED

The following references are of record in the file of this patent:

UNITED STATES PATENTS

| Number | Name | Date |
|---|---|---|
| Re. 21,681 | Roberts | Dec. 31, 1940 |
| 1,909,350 | Harrison | May 16, 1913 |
| 2,291,496 | Newstedt | July 28, 1942 |
| 2,382,128 | Branson | Aug. 14, 1945 |